United States Patent Office 3,454,559
Patented July 8, 1969

3,454,559
PREPARATION OF GUANOSINE AND INTERMEDIATES OBTAINED THEREBY
Akihiro Yamazaki and Takashi Meguro, Kawasaki-shi, Izumi Kumashiro, Yokohama-shi, and Tadao Takenishi, Tokyo, Japan, assignors to Ajinomoto Co., Inc., Tokyo, Japan
No Drawing. Continuation-in-part of application Ser. No. 577,832, Sept. 8, 1966. This application Jan. 26, 1968, Ser. No. 700,751
Claims priority, application Japan, Aug. 30, 1963, 38/45,453; Jan. 1, 1964, 39/3,551; Apr. 20, 1964, 39/22,006
Int. Cl. C07d; C07g 3/00
U.S. Cl. 260—211.5    18 Claims

ABSTRACT OF THE DISCLOSURE

Guanosine is synthetized from AICAR by conversion of the latter to 2-mercaptoinosine in a reaction with alkali metal alkyl xanthate, oxidation of the mercapto group obtained by oxidation with $NH_2$ by reaction with ammonia. Various derivatives of guanosine can be prepared from the corresponding AICAR derivatives in an analogous manner, by subjecting the 2-mercaptoinosine to secondary reactions prior to amination, and by reacting mercaptoinosine with compounds other than ammonia and containing an amino nitrogen carrying at least one active hydrogen atom.

---

This application is a continuation-in-part of our copending application Ser. No. 577,832, filed on Sept. 8, 1966, which itself is a continuation-in-part of the application Ser. No. 392,949, filed Aug. 28, 1964, and both now abandoned.

The present invention relates to the preparation of guanosine and 2-N-alkyl derivatives thereof, and to intermediate compounds for the synthesis of guanosine, and 2-N-alkylguanosine and more particularly to a method of synthesizing guanosine and 2-N-alkylguanosines from 5-amino-4-imidazolecarboxamide ribofuranoside.

Guanosine has an important use in the field of pharmacology. The sodium salts of the 5-'phosphates of guanosine and of the 2-N-lower-alkyl-guanosines have a pleasant taste and are useful seasoning agents.

An object of this invention is to provide an improved industrial process for preparing guanosine and its 2-N-alkyl derivatives on a large scale at low cost.

We have found that guanosine and its derivatives can be prepared from 5-amino-4-imidazolecarboxamide ribofuranoside, hereinafter referred to as AICAR, in a sequence of operations involving the reaction of AICAR with alkali metal alkyl xanthate to give 2-mercaptoinosine.

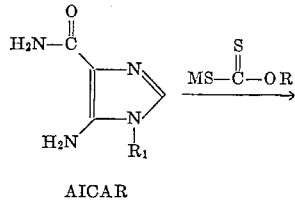

AICAR

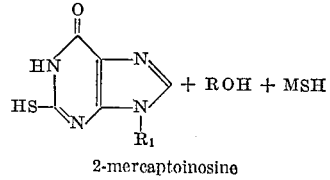

2-mercaptoinosine wherein M is alkali metal, R is lower alkyl, and $R_1$ is the ribofuranosyl group with or without substituent.

2-mercaptoinosine or a derivative thereof is oxidized and then reacted with ammonia, hydroxylamine, hydrazine, guanidine, or a primary or secondary amine to form guanosine or a 2-N-guanosine derivative.

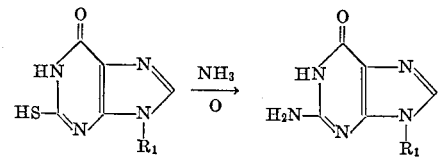

The method of this invention produces guanosine in very high yield and by a simple procedure from the relatively inexpensive and readily available AICAR.

We have found that AICAR when heated with alkali metal alkyl xanthate, is converted to 2-mercaptoinosine in very high yield. Derivatives of AICAR whose hydroxyl groups in 2' and 3' position are substituted with lower alkylidene groups, such as 5-amino-4-carbamoyl-1-(2',3'-O-isopropylidene-β-D-ribofuranosyl) imidazole, hereinafter referred to as isopropylidene-AICAR, can also be employed as a starting material in an analogous reaction whose product is a 2-mercapto-2',3'-O-alkylideneinosine.

AICAR, the primary starting material of our methods can be prepared enzymatically, (L. N. Lukens and G. M. Buchanan; J. Amer. Chem. Soc. 79 1511 (1957)), (J. G. Flaks, M. J. Erwin; J. Biol. Chem. 228 201 (1957)), by fermentation (Japanese Patent No. 305,243), or by chemical synthesis (E. Shaw et al., J. Chem. Soc. 1959, 1648; J. Amer. Chem. Soc. 80 3899, (1958 and ibid. 81 6021, (1959)).

Isopropylidene-AICAR may be obtained from AICAR by reaction with acetone in the presence of an acid or a Lewis acid. Isopropylidene-AICAR may be obtained also from methyl 5-amino-1-(2',3'-O-isopropylidene-β-D-ribofuranosyl) imidazole-4-carboxylate (G. Shaw et al.; J. Chem. Soc., 1962, 2937) by amination.

Preferred examples of alkali metal alkyl xanthates which can be used in the present invention are the alkali metal salts of lower alkyl xanthates, such as the methyl, ethyl, propyl or butyl xanthates. The alkali metal alkyl xanthate may be used in the purified state or in the form of crude mixtures obtained from the reaction of carbon disulfide with equimolar amounts of alkali metal hydroxide, such as potassium hydroxide, sodium hydroxide or lithium hydroxide in lower alkanol solution. The alkali metal alkyl xanthate is used in excess over the AICAR, preferably about 5 moles of xanthate per mol of AICAR or its derivative.

The reaction readily proceeds in any liquid medium in which AICAR or its derivatives are soluble and which is inert to the reactants, such as methyl alcohol, ethyl alcohol, propyl alcohol, butyl alcohol, or N,N-dimethylformamide. The temperature may be between about 50° C. and 250° C., and preferably is held between 120° C. and 200° C. The reaction may be carried out in a sealed tube or in an autoclave, if necessary. Although the time required for the reaction varies with the amount of reactants, the solvent used, and the reaction temperature, it generally goes to completion within 30 minutes to 5 hours.

2-mercaptoinosine and its lower alkylidene derivatives, such as the isopropylidene derivative, which are produced according to the present invention may be isolated from the reaction mixture by any of the conventional methods. For example, the reaction mixture is dissolved in water, alkali metals ions are removed by a strongly acidic cation exchange resin of the hydrogen ion type, and the resultant aqueous solution is decolorized. The decolorized solution is evaporated under reduced pressure until crude crystals of the product precipitate. The crude crystals may be recrystallized from water-soluble solvents. The ultimate yield of 2-mercaptoinosine and of its lower alkylidene derivatives is more than 80 percent.

2-mercaptoinosine and its derivatives may be identified by their characteristic ultra-violet and infrared absorption spectra, or by paper chromatography.

The following examples are further illustrative of the synthesis of 2-mercaptoinosine and its derivatives according to the invention, and it will be understood that the invention is not limited thereto.

EXAMPLE 1

Part A.—Preparation of isopropylidene–AICAR 138 ml. dry ethanol were mixed with 115 ml. dry acetone containing 9.1 g. anhydrous hydrogen chloride and 13.0 g. AICAR which had previously been dried at 80° C. for three hours in a vacuum were added to the mixture. The resulting solution was kept at room temperature for one hour. The reaction mixture was poured into 0.5 N aqueous ammonia to adjust the pH to 8.0.

The neutralized solution was concentrated under reduced pressure, and crystalline isopropylidene-AICAR was precipitated. It weighed 11.4 g. (79%). The melting point of the crystals was 166–170° C. (decomposed).

Only a single spot whose $Rf$ value was 0.82 was detected on a paper chromatogram of the crystals in an n-propanol-conc. ammonia-water system (20:12:3 parts by volume).

The crude crystals were recrystallized from a water-ethanol mixture. The pure crystalline isopropylidene-AICAR melted and decomposed at 170° C.

An elementary analysis of the crystals satisfied the expected formula. — Calculated for $C_{12}H_{18}O_5N_4$: C, 48.31%; H, 6.08%; N, 18.78. Found: C, 48.19%; H, 6.37%; N, 18.38%.

Part B.—Preparation of mercapto-isopropylidene-inosine

Three grams (10 millimoles) of isopropylidene-AICAR were dissolved in 30 ml. hot ethyl alcohol, 8.0 g. (50 millimoles) potassium ethyl xanthate were added to the solution, and the mixture was heated to 170° C. for 2 hours in a sealed tube.

After cooling, a precipitate formed in the reaction mixture was dissolved in 50 ml. water, the pH of the aqueous solution was adusted to about 3 by stirring with a strongly acidic cation exchange resin of the hydrogen ion type (Amberlite IR-120) at 10° C. The resin was removed by filtration, the filtrate was neutralized with 5 ml. concentrated ammonia water, and the neutralized solution was decolorized with 1 g. active charcoal.

The yield of 2-mercapto-2′,3′-O-isopropylideneinosine in the decolorized solution was measured by paper chromatography using an n-propanol-conc. ammonia-water system (20:12:3 parts by volume) and was found to be almost quantitative (100%).

The decolorized solution was concentrated under reduced pressure, the precipitate obtained was recrystallized from water, and 3.0 g. of pure crystals were obtained as yellow prisms, representing a yield of 83.4%. The crystals melted and decomposed at 241–243° C.

An elementary analysis of the purified crystals agreed with the values expected for the mono-ammonium salt of 2-mercapto-2′,3′-O-isopropylideneinosine. — Calculated for $C_{13}H_{19}O_5N_5S$: C, 43.70%; H, 5.32%; N, 19.61%; S, 9.19%. Found: C, 44.0%; H, 5.79%; N, 19.92%; S, 8.96%.

Ultra-violet absorption spectra of the crystals showed $\epsilon_{max}$ 234 and 296 m$\mu$ at pH 1, and $\epsilon_{max}$ 289 m$\mu$ at pH 13.

Absorption bands consistent with the expected structure were found in the infrared absorption spectrum of the crystals.

Only a single spot having an $Rf$ value of 0.65 was detected in a paper chromatogram which was made with the same solvent as described above.

EXAMPLE 2

The procedures of Example 1 were repeated, but 3.9 g. (30 millimoles) sodium methyl xanthate and 30 ml. methyl alcohol were substituted for the potassium ethyl xanthate and ethyl alcohol, respectively.

The monoammonium salt of 2-mercapto-2′,3′-O-isopropylideneinosine was obtained in a yield of 3.3 g. (91.7%). The melting point of the crystals was 240–243° C. (decomposed).

EXAMPLE 3

2.58 g. (10 millimoles) AICAR were dissolved in 100 ml. hot methyl alcohol, and 4.8 g. (30 millimoles) potassium ethyl xanthate were added to the solution. The mixture was heated to 170° C. for 2 hours in a sealed tube. After cooling, 100 ml. water were added to the reaction mixture. The pH of the aqueous solution was adusted to about 3 by adding 20 ml. Amberlite IR–120 of the hydrogen ion type. The resin was removed by filtration, 20 ml. concentrated ammonia solution were added to the filtrate, and the filtrate was decolorized with activated charcoal. The decolorized solution was concentrated under reduced pressure, unreacted AICAR was removed by extraction with methyl alcohol, and the residue was recrystallized from water. The purified crystals obtained weighed 2.1 g. (66.2%) and melted at 183–186° C.

An elementary analysis of the crystals had the following results.—Calculated for $C_{10}H_{15}O_5N_5S$: C, 37.55%; H, 4.99%; N, 22.53%. Found: C, 37.86%; H, 4.73%; N, 22.08%.

Ultra-violet absorption spectra of the crystals showed $\lambda_{max}$ 231.5 and 294 m$\mu$ at pH 1, $\lambda_{max}$ 234 and 289 m$\mu$ at pH 13, and $\lambda_{max}$ 296 m$\mu$ at pH 6.

A single spot of $Rf$ value 0.50 was detected on a paper chromatogram made with the solvent of Example 1, and also a single spot of $Rf$ value 0.16 was obtained by a mixed solvent of butanol-acetic acid-water (4:1:1 parts by volume).

We also have found that 2-mercaptoinosine or its lower alkylidene derivatives, such as 2-mercapto-2′,3′-O-isopropylideneinosine, when dissolved or suspended in a suitable solvent may be oxidized, and that the oxidation product when heated with ammonia, hydroxylamine, hydrazine, guanidine, or a primary or secondary amine, is converted to guanosine or its derivatives in very high yield.

According to the present invention, the oxidation of 2-mercaptoinosine or its derivatives is carried out at about 0° to 100° C., preferably at room temperature (about 15–30° C.) and takes about 20 minutes to 24 hours. However, when chlorine is the oxidizing agent, the reaction should be carried out below —30° C., in order to avoid decomposition of the reaction product by the heat of dissolution of chlorine and the heat of the reaction. 2-mercaptoinosine may be readily oxidized with chlorine by passing gaseous chlorine through a solution or suspension of the material in a liquid medium.

After removal of unreacted oxidizing agent, catalyst (if used), and insoluble by-products from the reaction solution, the dissolved oxidation product is aminated by heating with an amine or with ammonia, hydroxylamine, hydrazine, or guanidine without isolation though it may be isolated as an intermediate. The amination temperature is preferably between 80 and 130° C., and the time required for the reaction is about 20 minutes to 10 hours.

Amination with ammonia is carried out by mixing the solution of the oxidation product with a suitable solvent saturated with gaseous ammonia while cooling, and then heating the mixture. When the oxidation is performed with chlorine, the chlorine should be carefully removed from the oxidation solution by aeration before amination, because ammonium chloride is formed by a reaction between the unreacted chlorine and ammonia, and the rapid exothermic reaction may bring about a combustion of the solvent. The reaction solution is yellow after oxidation with chlorine, and becomes colorless after removal of the chlorine. The change of color indicates adequate removal of chlorine from the reaction solution.

Other starting materials for the oxidation and amination reactions of this invention include derivatives of 2-mercaptoinosine in which the hydrogen atoms of the 2'- and 3'-hydroxy groups in the ribofuranosyl moiety are replaced by lower alkylidene groups other than isopropylidene, derivatives of 2-mercaptoinosine and 2-mercapto-2',3'-O-isopropylideneinosine in which the mercapto groups in the 2-position of the hypoxanthine moiety has an alkyl or aralkyl substituent, such as 2-methylmercaptoinosine, or 2-methylmercapto-2',3'-O-isopropylideneinosine, and alkali metal or ammonium salts of 2-mercaptoinosine whose hydroxyl groups in the 2',3'-positions of the ribofuranosyl moiety may or may not be substituted. 2-methylmercaptoinosine may be prepared by reacting 2-mercaptoinosine with a methylating agent, such as methyl iodide, or dimethyl sulfate and other substituents are introduced into the mercapto-radical in an analogous manner.

Oxidizing agents which have been used successfully in the reaction of the present invention include alkali metal permanganates, alkali metal hypochlorites, peracetic acid, hydrogen peroxide, oxygen, air, and chlorine. The necessary amount of these oxidizing agents varies between equimolecular amounts and a large excess. Alkali metal permanganates are preferably used in equimolecular amounts or with a small excess, whereas other oxidizing agents are used in an excess of up to 20 moles. An unecessary excess of oxidizing agent may cause undesirable side reactions such as the decomposition of the purine ring or the removal of a substituent from the 2'- and 3'-positions of the ribofuranosyl group. When a large excess of permanganate is employed, the yield decreases, because a part of the product is adsorbed on the manganese dioxide formed. When oxygen or air are used as oxidizing agents, platinum oxide, platinum or palladium are preferably employed as oxidation catalysts, but any other catalyst known to enhance oxidation of mercapto radicals by elementary oxygen may be employed.

Other reagents suitable for the amination reaction of the present invention include inorganic compounds having an $NH_2$ group, such as hydroxylamine, hydrazine, or guanidine, amines having an active hydrogen atom attached to their aminonitrogen and up to ten carbon atoms, including primary amines, such as methylamine, ethylamine, n-propylamine, n-butylamine, cyclohexylamine, or benzylamine, secondary amines, such as dimethylamine, morpholine, or piperidine, and higher and lower homologs of these primary and secondary amines, such as di-n-pentylamine. They may be used in aqueous solutions or in lower alkanol solutions.

Ammonia may be used as ammonia water, as its lower alkanol solution or as liquid ammonia.

The amination reaction may be carried out in a sealed tube or in an autoclave if carried out above the boiling temperature of the reaction mixture, as is preferred.

Guanosine or its derivatives produced according to the present invention may be isolated from the amination mixture by any of the conventional methods, for example, by solvent evaporation.

EXAMPLE 4

One gram of the ammonium salt of 2-mercapto-2',3'-O-isopropylideneinosine was mixed with 5.0 ml. methanol, and 3 liters gaseous chlorine were introduced into the mixture over about 10 minutes in a Dry Ice-acetone bath which maintained the temperature at 0–40° C., and yellow, clear solution was obtained. Air was then passed through the solution at −30° C. until the reaction solution was colorless. The colorless solution was added drop by drop to 60 g. methanol saturated with gaseous ammonia at −30° C. The resulting mixture was kept at 130° C. for 5 hours in a sealed tube. Methanol and ammonia were distilled off under reduced pressure from the reaction mixture, water was added, and the mixture was partly evaporated. 0.65 gram crude crystalline 2',3'-O-isopropylideneguanosine was obtained. The crude crystals were dissolved in water, the aqueous solution was decolorized with active charcoal, and the clear solution obtained was evaporated under reduced pressure to precipitate pure crystals. After drying, they weighed 0.54 g.

A single spot was detected on a paper chromatogram of the crystals in n-propanol-conc. ammonia-water (Rf: 0.66) and in n-butanol-acetic acid-water (Rf: 0.63).

The ultra-violet absorption spectra at pH 13, 6 and 1 and the infrared spectrum of the crystals were in agreement with those published for 2',3'-O-isopropylideneguanosine.

An elementary analysis of the crystals agree with the calculated values.—Calculated for $C_{13}H_{17}O_5N_5 \cdot \frac{1}{2}H_2O$: C, 47.01%; H, 5.12%; N, 21.08%. Found: C, 47.33%; H, 5.50%; N, 21.44%.

EXAMPLE 5

10.8 g. of the potassium salt of 2-mercapto-2',3'-O-isopropylideneinosine were subjected to a procedure analogous to that described in Example 4, and 0.73 g. of pure crystalline 2',3'-O-isopropylideneguanosine were obtained. The Rf values obtained by paper chromatography, the ultra-violet and infrared absorption spectra, and the elementary analysis agreed with published data.

EXAMPLE 6

1.00 g. of the ammonium salt of 2-mercaptoinosine was suspended in 3 ml. methanol, and 3 liters gaseous chlorine were introduced into the suspension over a period of 10 minutes while cooling in a Dry Ice-acetone bath of −40° C. Air was then passed through the reaction solution at −30° C. until the solution became colorless. The colorless solution added drop by drop to methanol saturated with ammonia as described in Example 4, and the mixture was kept at 130° C. for five hours in a sealed tube. The reaction solution was worked up as in the preceding examples and 0.5 g. of pure crystalline guanosine were obtained.

A paper chromatogram of the crystals showed a single spot of Rf 0.42 in n-propanol solvent, and Rf 0.23 in n-butanol.

An elementary analysis of the crystals had the following results.—Calculated for $C_{10}H_{13}N_5O_5$: C, 42.40%; H, 4.63%; N, 24.73%. Found: C, 42.56%; H, 4.76%; N, 24.50%.

EXAMPLE 7

1.00 g. of the ammonium salt of 2-mercapto-2',3'-O-isopropylideneinosine was dissolved in 20 ml. of an aqueous solution containing 950 mg. potassium permanganate, and the solution was stirred for 2 hours at 40° C. A precipitate formed and was removed by centrifuging, the supernatant liquid and the washings were mixed with 40 ml. ethanol saturated with gaseous ammonia at 0° C., and the mixture was kept at 130° C., for 4 hours with stirring in a 200 ml. stainless steel autoclave. The reaction mixture was filtered, and the filtrate was evaporated to dryness under reduced pressure. The residue was dissolved in water and the solution was concentrated to precipitate crude crystalline 2',3'-O-isopropylideneguanosine.

The crude crystals were dissolved in water, decolorized by treatment with active charcoal, and reprecipitated by evaporation. The pure crystals weighed 0.45 g. (49.8%).

A paper chromatogram of the crystals showed a single spot of Rf 0.66 in n-propanol solvent and Rf 0.63 in n-butanol.

Ultra-violet absorption spectra of aqueous solutions at pH 13, 6 and 1, and the infrared absorption spectrum were in excellent agreement with those published.

An elementary analysis of the crystals had the following results.—Calculated for $C_{13}H_{17}O_5N_5 \cdot \frac{1}{2}H_2O$: C, 46.98%; H, 5.47%; N, 21.07%. Found: C, 47.36%; H, 5.54%; N, 20.85%.

EXAMPLE 8

1.00 g. of the ammonium salt of 2-mercapto-2',3'-O-isopropylideneinosine was dissolved in 20 ml. 7% aqueous sodium hypochlorite which had been prepared from sodium hydroxide and chlorine, and the solution was kept at room temperature for 30 minutes with stirring. It was then mixed with 40 ml. ethanol saturated with gaseous ammonia at 0° C. and the mixture was kept at 120° C. for 4 hours in an autoclave. A precipitate formed by the reaction was removed by filtration, the filtrate was evaporated to dryness under reduced pressure, and the residue was dissolved in water. To this solution was added activated charcoal (Tsurumi coal GV-80) portionwise and with stirring until the solution became free from ultra-violet absorbing material. The charcoal was filtered and washed with water thoroughly. Elution was achieved by 500 ml. of a mixture of ethanol-water-conc. ammonia (7:7:1, v./v.). After removal of the charcoal by filtration, the eluate was concentrated in vacuo to dryness, and the residues were crystallized from water to give 0.45 g. (53%) of pure 2',3'-O-isopropylideneguanosine.

EXAMPLE 9

500 mg. of the ammonium salt of 2-mercapto-2',3'-O-isopropylideneinosine were dissolved in 10 ml. water, the solution was added dropwise with stirring to aqueous peracetic acid which had been prepared from the glacial acetic acid and a 5-molar excess of aqueous hydrogen peroxide solution, and the mixture was kept at 50° C. for 30 minutes. The oxidation mixture was added to 30 ml. of solution saturated with ammonia at 0° C., and the mixture was kept at 120° C. for 3 hours in an autoclave. The resulting solution was evaporated to dryness, the residue was dissolved in 10 ml. water, and the aqueous solution was worked up by ion exchange resin treatment as in Example 8. The eluate obtained was evaporated, and 356.5 mg. of crude crystals were obtained.

The crystals were found by paper chromatography to be a mixture of 64% 2',3'-O-isopropylideneguanosine and 36% guanosine. The yield of 2',3'-O-isopropylideneguanosine was 49.9%, and that of guanosine was 32.4%.

EXAMPLE 10

500 mg. of 2-mercapto-2',3'-O-isopropylideneinosine were dissolved in an aqueous solution containing 1.59 g. of 30% $H_2O_2$, and stirred for 3 hours at room temperature. The resulting solution was mixed with 20 ml. conc. aqueous ammonia, and the mixture was kept at 140° C. for 30 minutes in an autoclave. The reaction mixture was evaporated under reduced pressure to precipitate crude crystals which were recrystallized from water. The pure crystals weighed 394 mg. (84%). Only a single spot was detected on a paper chromatogram, and ultra-violet and infrared absorption spectra agreed with those published for 2',3'-O-isopropylideneguanosine.

EXAMPLE 11

500 mg. of 2-mercaptoinosine was treated as described in Example 10, and 328 mg. of pure crystalline guanosine were obtained in a yield of 73.5%.

Only a single spot was detected on a paper chromatogram with n-propanol solvent (Rƒ 0.42), and with n-butanol (Rƒ 0.23).

The ultra-violet and infrared absorption spectra were in agreement with those published for guanosine, and with those of pure crystalline guanosine which was prepared by heating the 2',3'-O-isopropylideneguanosine obtained in Example 7 with 0.1 N HCl for 2 hours to 70° C.

An elementary analysis of the crystals had the following results.—Calculated for $C_{10}H_{13}N_5O_5$: C, 42.40%; H, 4.63%; N, 24.73. Found: C, 42.85%; H, 4.51%; N, 24.91%.

EXAMPLE 12

Part A.—Preparation of 2-methylsulfonyl-2',3'-O-isopropylideneinosine 2-mercapto-2',3'-O-isopropylideneinosine was reacted with methyl iodide in sodium hydroxide solution to form 2-methylmercapto-2',3'-isopropylideneinosine. 5.0 g. of the 2-methylmercapto-2',3'-O-isopropylideneinosine were dissolved in 100 ml. 15% aqueous hydrogen peroxide solution and oxidized thereby as described in Example 10. The resulting solution was evaporated in a vacuum, ethanol was added to the residue, and the mixture was filtered. The filtrate was evaporated and 5.5 g. of 2-methylsulfonyl-2',3'-O-isopropylideneinosine were obtained as a colorless powder.

Note: Properties of 2-methylmercapto-2',3'-O-isopropylideneinosine (1)         M.P. 212–213° C. (decomposed)

(2)

$(\alpha)_D^{23} = -22.6$ (in a 0.1 N NaOH solution C=1

(3)   $\lambda_{max.}^{pH 1} = 270$ m$\mu$, $\lambda_{max.}^{pH 7} = 260$ m$\mu$, $\lambda_{max.}^{pH 13} = 273$ m$\mu$ (4)         Rƒ in n-propanol system 0.72

Rƒ in n-butanol system 0.74

*Elementary analysis.*—Calculated for $C_{14}H_{18}O_5N_4S$: C, 47.45%; H, 5.12%; N, 15.81%. Found: C, 47.71%; H, 5.32%; N, 15.57%.

Properties of 2-methylsulfonyl-2',3'-O-isopropylideneinosine (1)         $\lambda_{max.}^{pH 1} = 225$ and 283 m$\mu$ $\lambda_{max.}^{pH 7} = 258$ and 280 m$\mu$ $\lambda_{max.}^{pH 13} = 258$ and 280*m$\mu$*:shoulder (2)         Rƒ = 0.73 in n-propanol system Rƒ = 0.57 in n-butanol system Part B.—Preparation of 2-N-methyl-2',3'-O-isopropylideneguanosine The 2-methylsulfonyl-2'-3'-O-isopropylideneinosine was dissolved in 10 ml. water, 70 ml. 30% aqueous methylamine solution were added dropwise, and the resultant solution was kept at 120° C. for 3 hours in an autoclave. The reaction solution was evaporated under reduced pressure, and the residue obtained was recrystallized from a small amount of water and aqueous ammonia. The pure crystals of 2-N-methyl-2',3'-O-isopropylideneguanosine weighed 2.24 g., representing a yield of 42% based on 2-mercapto-2',3'-O-isopropylideneinosine. The melting point of the crystals was 267–268° C. (decomposed).

Only a single spot was detected on a paper chromatogram with n-propanol solvent (Rƒ 0.72) and with n-butanol (Rƒ 0.66).

$\lambda_{max.}^{pH 1} = 262$ m$\mu$ and 285 (S) m$\mu$ $\lambda_{max.}^{pH 7} = 255$ m$\mu$ and 280 (S) m$\mu$ $\lambda_{max.}^{pH 13} = 262$ m$\mu$ and 276 (S) m$\mu$ $(\alpha)_D^{23} = -40$ (C=1), in 0.1 N NaOH An elementary analysis agreed with that of 2-N-methyl-2',3'-O-isopropylideneguanosine.

Calculated for $C_{14}H_{19}O_5N_5$: C, 49.84%; H, 5.68%; N, 20.76%. Found: C, 49.62%; H, 5.59%; N, 20.64%.

EXAMPLE 13

2.0 grams 2-methylmercapto-2′,3′-isopropylideneinosine were oxidized as described in Example 12 and then aminated with 40 ml. 70% aqueous ethylamine solution. 2.0 grams of 2-methyl-sulfonyl-2′,3′-O-isopropylidene-inosine prepared as described in Example 12 were reacted with various primary amines listed in the following Table 1–A and 2-N-substituted-2′,3′-O-isopropylidene-guanosine derivatives were obtained.

TABLE 1–A

| Starting material | Primary amine | 2-N-substituent | Yield |
|---|---|---|---|
| 2-methylmercapto-2′,3′-isopropylideneinosine | 70% ethylamine, 40 ml. [1] | Ethyl | 28%, 540 mg. |
| 2-methylsulfonyl-2′,3′-O-isopropylideneinosine | n-propylamine, 50 g.[1] | n-Propyl | 53%, 1.0 g. |
| Do | n-butylamine, 25 g.[1] | n-Butyl | 36%, 700 mg. |
| Do | Cyclohexyl amine, 25. g.[2] | Cyclohexyl | 25%, 395 mg. |

[1] Heated at 120° C. for 4 hours.
[2] Refluxed for 3 hours.

The properties of the reaction products are listed in the following Table 1–B.

TABLE 1–B

| | M.P.,° C. | Rf value Solvent A | Rf value Solvent B | $(\alpha)_D^{23}$ | $\lambda_{max}$ m$\mu$ pH 1 | $\lambda_{max}$ m$\mu$ pH 7 | $\lambda_{max}$ m$\mu$ pH 13 |
|---|---|---|---|---|---|---|---|
| 2-N-substituent: | | | | | | | |
| Ethyl | 258–259(d) | 0.84 | 0.74 | −21.5° | 263, 287(s) | 257, 284(s) | 264, 280(s) |
| n-Propyl | 253(d) | 0.86 | 0.83 | −12.5° | 263, 287(s) | 257, 282(s) | 263, 280(s) |
| n-Butyl | 234(d) | 0.90 | 0.87 | | 263, 287(s) | 256, 280(s) | 262, 280(s) |
| Cyclohexyl | 266–267(d) | 0.91 | 0.83 | +8.95° | 263, 290(s) | 257, 280(s) | 263, 280(s) |

(d)=decomposed.
(s)=shoulder.
Solvent A=n-propanol-conc. ammonia-water.
Solvent B=n-butanol-acetic acid-water.

The elementary analysis of the products, was as follows (X=2′,3′-O-isopropylideneguanosine):

Calculated for $C_{15}H_{20}O_5N_5$ (2-N-ethyl X): C, 51.43%; H, 5.71%; N, 19.99. Found: C, 51.17; H, 6.09; N, 19.69%.

| 2-N-butyl | C(%) | H(%) | N(%) |
|---|---|---|---|
| Found | 53.80 | 6.79 | 18.79 |
| Calculated for $C_{17}H_{25}O_5N_5$ | 53.81 | 6.64 | 18.46 |

| 2-N-cyclohexyl-X | C(%) | H(%) | N(%) |
|---|---|---|---|
| Found | 54.50 | 7.01 | 16.20 |
| Calculated for $C_{19}H_{27}O_5N_5$ | 53.89 | 6.92 | 16.54 |

Calculated for $C_{16}H_{23}O_5N_5$ (2-N-propyl-X): C, 52.59; H, 6.35%; N, 19.17%. Found: C, 52.73%; H, 6.47%; N, 19.11%.

Calculated for $C_{17}H_{25}O_5N_2$ (2-N-butyl-X): C, 53.81%; H, 6.64%; N, 18.46%. Found: C, 53.80%; H, 6.79%; N, 18.79%.

Calculated for $C_{19}H_{27}O_5N_5$ (2-N-cyclohexyl-X): C, 53.89%; H, 6.92%; N, 16.54%. Found: C, 54.50%; H, 7.01%; N, 16.20.

EXAMPLE 14

5.0 grams 2-methylmercapto-2′,3′-O-isopropylidene-inosine were oxidized with $H_2O_2$ as desired in Example 10, the reaction solution was added to 70 ml. of an aqueous 30% dimethylene solution and the mixture was heated to 120° C. for 3 hours. The pure crystalline 2-N,N-dimethyl-2′,3′-O-isopropylideneguanosine obtained weighed 1.5 g. (30.2%). It had the following properties.

M.P. 151–152° (decomposed)

R$f$ value=0.76 in solvent A

R$f$ value=0.72 in solvent B $(\alpha)_D^{23}=-19.6$ $\lambda_{max}^{pH 1}=267$ and 298 (s) m$\mu$ $\lambda_{max}^{pH 7}=261$ m$\mu$ and 290 (s)

$\lambda_{max}^{pH 13}=266$ m$\mu$ (s) :shoulder

The elementary analysis was as follows.—Calculated for $C_{15}H_{21}O_5N_5 \cdot \frac{1}{2}H_2O$: C, 49.99%; H, 6.17%; N, 19.43%. Found: C, 50.41%; H, 6.34%; N, 19.40%.

EXAMPLE 15

3.0 grams 2-methylsulfonyl-2′,3′-O-isopropylideneinosine and 50 ml. morpholine were refluxed for 3 hours, and 1.22 g. 2-morpholino-2′,3′-O-isopropylideneinosine were obtained (40%). The compound had the following properties:

M.P. 213° C

Rf=0.75 in solvent A

Rf=0.77 in solvent B $(\alpha)_D^{23}=12.7$ $\lambda_{max}^{pH 1}=268$ m$\mu$ $\lambda_{max}^{pH 7}=273$ and 285 (s) m$\mu$ $\lambda_{max}^{pH 13}=268$ m$\mu$ (s) : shoulder Calculated for $C_{17}H_{23}O_6N_5$: C, 51.90%; H, 5.89%; N, 17.80. Found: C, 52.24%; H, 6.07%; N, 17.67%.

When 1.0 g. 2-methylsulfonyl-2′,3′-O-isopropylidene-inosine and 70 ml. piperidine were refluxed for 5 hours, 0.1 g. of pure 2-piperidino-2′,3′-O-isopropylidene-inosine were obtained (10%) and had the following properties:

M.P. 196° C.

Rf=0.85 in solvent A

Rf=0.87 in solvent B $\lambda_{max}^{pH 1}=270$ and 300 (s) m$\mu$ $\lambda_{max}^{pH 7}=268$ and 300 (s) m$\mu$ $\lambda_{max}^{pH 13}=268$ m$\mu$ (s) : shoulder Calculated for $C_{18}H_{25}O_5N_5 \cdot \frac{1}{2}H_2O$: C, 53.99%; H, 6.56%; N, 17.49%. Found: C, 53.88%; H, 6.43%; N, 17.42%.

EXAMPLE 16

40 grams 2-methylsulfonyl-2',3'-O-isopropylideneinosine were added to 100 ml. ethanol containing 4 g. hydrazine hydrate, and the mixture was refluxed for 3 hours. 3.9 grams 2-hydrazino-2',3'-O-isopropylideneinosine were obtained (78.5%). The compound had the following properties:

Rf=0.68 in solvent A

Rf=0.83 in solvent B

M.P. of picrate=190–192° C. (decomposed)

$\lambda_{max.}^{pH1}=254$ m$\mu$ $\lambda_{max.}^{pH7}=256$ and 280 (s) m$\mu$ $\lambda_{max.}^{pH13}=260$ m$\mu$ (s): shoulder 2-hydrazino-2',3'-O-isopropylideneinosine was refluxed with Raney nickel in 50% ethanol for 4 hours, the reaction mixture was filtered, and the filtrate was evaporated under reduced pressure. The residue obtained was recrystallized from water. Purified crystalline 2',3'-O-isopropylideneguanosine was obtained in a yield of 56%.

1.9 grams 2-methylsulfonyl-2',3'-O-isopropylideneinosine were refluxed in 100 ml. ethanol containing 2.5 g. hydroxylamine for 4 hours, and 1.4 g. 2-hydroxylamine-2',3'-O-isopropylideneinosine were obtained (76.9%), having the following properties:

Rf=0.60 in solvent A

Rf=0.55 in solvent B $\lambda_{max.}^{pH1}=230$ and 265 m$\mu$ $\lambda_{max.}^{pH1}=250$ and 278 m$\mu$

EXAMPLE 17

2-mercapto-2',3'-O-isopropylideneinosine was reacted with benzyl chloride at room temperature, and 2-benzylmercapto-2',3'-O-isopropylideneinosine was obtained 632 mg. of this compound were treated with $H_2O_2$ and ammonia as described in Example 10, and 2',3'-O-isopropylideneguanosine was obtained in a yield of 78%.

Properties of 2-benzylmercapto-2',3'-O-isopropylideneinosine:

M.P.=230° C. (decomposed)

Rf=0.83 in solvent A

Rf=0.93 in solvent B $(\alpha)_D^{23}=-34.1$ (in N, N–dimethylformamide)

$\lambda_{max.}^{pH1}=265$ and 282 (s) m$\mu$ $\lambda_{max.}^{pH7}=265$ m$\mu$ $\lambda_{max.}^{pH13}=273$ m$\mu$ (s): shoulder Calculated for $C_{20}H_{22}O_5N_4S$: C, 55.81%; H, 5.15%; N, 13.02%. Found: C, 55.61%; H, 5.38%; N, 12.89%.

EXAMPLE 18

5.0 grams ammonium salt of 2-mercaptoinosine was dissolved in 30 ml. water, 18 g. of 30% hydrogen peroxide was added dropwise with stirring to the solution, and the mixture was left to stand with stirring at 5–10° C. for one hour. Thirty milliliters of ethanol was added to the reaction mixture, the solution obtained was left to stand to precipitate colorless crystals, and the crystals were recovered by filtration and washed with water.

The crude crystals were recrystallized from water-ethanol solution, and the pure crystalline ammonium 2-sulfo-inosine obtained weighed 2.7 g. in a yield of 47%.

Properties of ammonium 2-sulfoinosine:

M.P.=148–153° C.

$(\alpha)_D^{26}=-15.3$ ($H_2O$, C=1)

$\lambda_{max.}^{pH1}=255$ and 280 (s) m$\mu$ $\lambda_{max.}^{pH6.4}=255$ and 277 m$\mu$ $\lambda_{max.}^{pH13}=258$ and 280 (s) m$\mu$ Rf=0.30 in solvent A Rf=0.03 in solvent B Calculated for $C_{10}H_{15}O_8N_5S\cdot\frac{1}{2}H_2O$: C, 32.09%; H, 4.28%; N, 18.72%. Found: C, 32.07%; H, 4.58%; N, 18.79%.

EXAMPLE 19

Gaseous ammonia was introduced to saturation into 50 ml. of water, to the ammonia water 5 g. of ammonium 2-sulfoinosine was added, and the solution obtained was heated to 130° C. for 2 hours in an autoclave. The reaction mixture was concentrated under diminished pressure, the crystals precipitated were recovered by filtration and recrystallized from water to give 3.1 g. of pure guanosine crystals in a yield of 82%.

Properties of the pure crystals:

Rf=0.42 in solvent A

Rf=0.23 in solvent B

The ultraviolet and infrared absorption spectra were the same as those of guanosine.

Calculated for $C_{10}H_{13}N_5O_5$: C, 42.40%; H, 4.63%; N, 24.73%. Found: C, 42.56%; H, 4.76%; N, 24.50%.

EXAMPLE 20

Two grams of ammonium 2-sulfoinosine was dissolved in 20 ml. of water, to the solution of 30 ml. of 30% aqueous methylamine solution was added dropwise with stirring, and the mixture was heated to 130° C. for 3 hours in an autoclave. The reaction mixture was concentrated under diminished pressure, the precipitates obtained were recovered by filtration, and the crude crystals were recrystallized from water to give 1.00 g. of pale yellow needles in a yield of 51%.

Properties of the pure crystals:

M.P.=233° C. (decomposed)

Rf=0.57 in solvent A

Rf=0.20 in solvent B $(\alpha)_D^{26}=-42.9$ (0.1 N NaOH, C=1)

$\lambda_{max.}^{pH1}=260$ and 285 (s) m$\mu$ $\lambda_{max.}^{pH7}=258$ and 280 (s) m$\mu$ $\lambda_{max.}^{pH13}=259$ and 275 (s) m$\mu$ Calculated for $C_{11}H_{15}O_5N_5\cdot H_2O$: C, 41.90%; H, 5.39%; N, 22.24%. Found: C, 41.97%; H, 5.41%; N, 22.94%.

From the above results, the pure crystals were identified as 2-N-methylguanosine monohydrate.

EXAMPLE 21

2-sulfoinosine and 30 ml. of 30% aqueous dimethylamine was reacted and treated in the same procedure as in Example 20, and 0.92 g. of pure crystalline 2-N,N-dimethylguanosine was obtained as colorless needles.

Properties of 2-N,N-dimethylguanosine:

M.P.=235–236° C.

Rf=0.64 in solvent A

Rf=0.28 in solvent B $(\alpha)_D^{25} = -35.8$ (0.1 N NaOH, C=1)

$\lambda_{max}^{pH\,1} = 265$ and 295 (s) m$\mu$ $\lambda_{max}^{pH\,7} = 262$ and 285 (s) m$\mu$ $\lambda_{max}^{pH\,13} = 265$ and 285 (s) m$\mu$ While the invention has been described with particular reference to specific embodiments, it is to be understood that it is not limited thereto, but is to be construed broadly and restricted solely by the scope of the appended claims.

What we claim is:
1. 2-mercaptoinosine.
2. 2-mercapto-2',3'-O-isopropylideneinosine.
3. A method of preparing 2-mercaptoinosine, which comprises reacting 5-amino-4-imidazolecarboxamide ribofuranoside with an alkali metal lower-alkyl xanthate in a liquid medium.
4. A method of preparing 2-mercapto-2',3'-O-isopropylidene-inosine, which comprises reacting 5-amino-4-carbamoyl-1-(2',3'-O-isopropylidene - $\beta$ - D - ribofuranosyl) imidazole with an alkali metal lower alkyl xanthate in a liquid medium.
5. A method of preparing guanosine and derivatives thereof which comprises reacting a compound to the formula

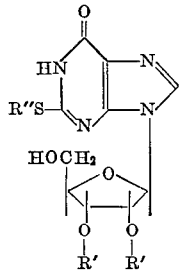

wherein R' is a member of the group consisting of hydrogen and hydrocarbon, the two R', when hydrocarbon, jointly constituting a lower alkylidene radical, and R" is a member of the group consisting of hydrogen, ammonium, alkali metal, lower alkyl, and aryl-lower-alkyl, with an oxidizing agent until the S—R" group of said compound is oxidized, and reacting the oxidation product with a compound selected from the group consisting of ammonia, hydroxylamine, hydrazine, guanidine and primary and secondary amines having up to ten carbon atoms.
6. A method as set forth in claim 5, wherein said oxidizing agent is a member selected from the group consisting of alkali metal salts of permanganic acid, alkali metal salts of hypochloric acid, peracetic acid, hydrogen peroxide, oxygen, air, and chlorine.
7. A method of preparing guanosine, which comprises reacting 2-mercaptoinosine with an oxidizing agent until the 2-mercapto group of said 2-mercaptoinosine is oxidized and reacting the oxidation product obtained with ammonia.
8. A method of preparing a 2-N-substituted guanosine, which comprises reacting 2-mercaptoinosine with an oxidizing agent until the 2-mercapto group of said 2-mercaptoinosine is oxidized and reacting the oxidation product obtained with a primary or secondary amine having up to ten carbon atoms.
9. A method as set forth in claim 8, wherein said amine is a lower-alkyl-amine.

10. A method of preparing 2',3'-O-isopropylideneguanosine which comprises reacting 2-mercapto-2',3'-O-isopropylideneinosine with an oxidizing agent until the 2-mercapto group of said 2-mercapto-2',3'-O-isopropylideneinosine is oxidized, and reacting the oxidation product obtained with ammonia, hydroxyalmine, hydrazine, or guanidine.
11. A method of preparing 2-N-substituted 2',3'-O-isopropylideneguanosine, which comprises reacting 2-mercapto-2',3'-O-isopropylideneinosine with an oxidizing agent until the 2-mercapto group of said 2-mercapto-2',3'-O-isopropylideneinosine is oxidized and reacting the oxidation product obtained with a primary or secondary amine having up to ten carbon atoms.
12. A method of preparing guanosine and 2-N-substituted guanosine from 5-amino-4-imidazolecarboxamide ribofuranoside which comprises:
(a) reacting said ribofuranoside with an alkali metal lower-alkyl xanthate until 2-mercaptoinosine is produced,
(b) reacting said 2-mercapto inosine with an oxidizing agent until the 2-mercapto group of said 2-mercaptoinosine is oxidized, and
(c) reacting the oxidation product obtained with a compound selected from the group consisting of ammonia, hydroxylamine, hydrazine, guanidine and primary and secondary amines having up to ten carbon atoms.
13. A method of preparing 2',3'-O-isopropylidine guanosine and 2-N-substituted-2',3'-O-isopropylideneguanosine from 5 - amino - 4 - carbamoyl - 1-(2',3'-O-isopropylidene-$\beta$-D-ribofuranosyl) imidazole, which comprises:
(a) reacting said imidazole with an alkali metal lower-alkyl xanthate until 2-mercapto-2',3'-O-isopropylideneinosine is produced,
(b) reacting said 2-mercapto-2',3'-O-isopropylideneinosine with an oxidizing agent until the mercapto group of said 2-mercapto-2',3'-O-isopropylideneinosine is oxidized, and
(c) reacting the oxidation product obtained with a compound selected from the group consisting of ammonia, hydroxylamine, hydrazine, guanidine and primary and secondary amines having up to ten carbon atoms.
14. 2-sulfoinosine.
15. A method of preparing 2-sulfoinosine which comprises reacting 2-mercaptoinosine with an oxidizing agent.
16. A method as set forth in claim 15, wherein said oxidizing agent is a member selected from the group consisting of alkali metal salts of permanganic acid, alkali metal salts of hypochloric acid, peracetic acid, hydrogen peroxide and oxygen.
17. A method of preparing guanosine, which comprises reacting 2-sulfoinosine with ammonia, hydroxylamine, hydrazine, or guanidine.
18. A method of preparing 2-N-substituted guanosine, which comprises reacting 2-sulfoinosine with a primary or secondary amine having up to ten carbon atoms.

References Cited

UNITED STATES PATENTS

| | | | |
|---|---|---|---|
| 3,116,282 | 12/1963 | Hunter | 260—211.5 |
| 3,332,935 | 7/1967 | Yamazaki et al. | 260—211.5 |

LEWIS GOTTS, *Primary Examiner.*

J. R. BROWN, *Assistant Examiner.*